G. L. THORNE.
Portable-Heater.
No. 204,862. Patented June 11, 1878.
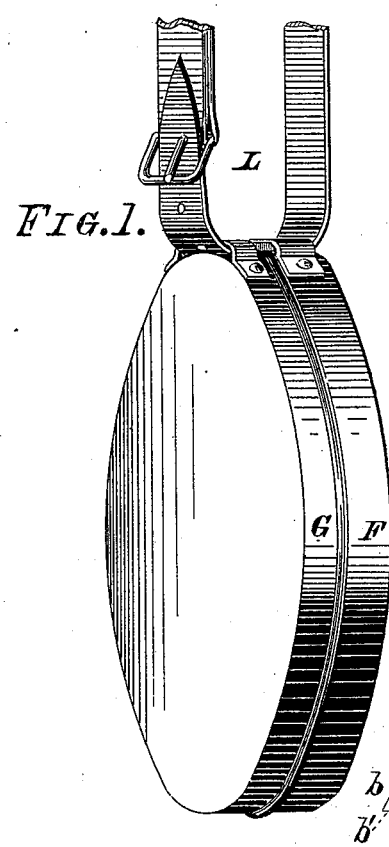
Fig. 1.
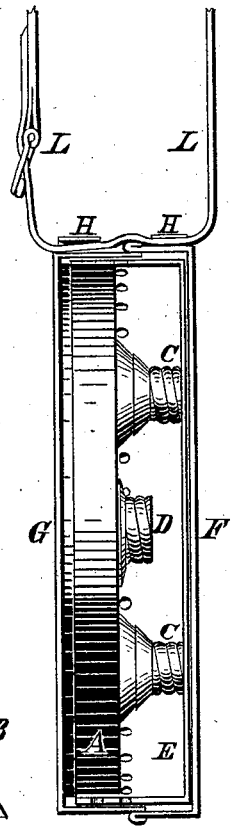
Fig. 2.
Fig. 3.
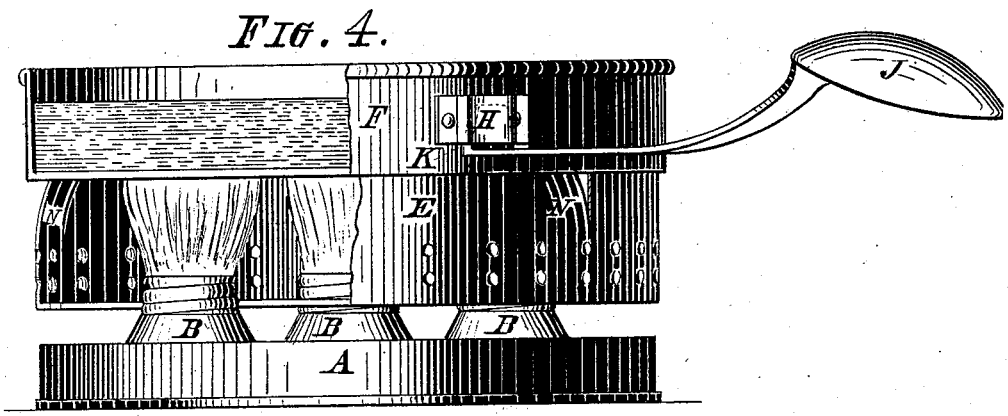
Fig. 4.
Witnesses:
Frank Hirsch
Chas. Brosart
Inventor:
Geo. L. Thorne,
by Michael J. Stark
his atty.

UNITED STATES PATENT OFFICE.

GEORGE L. THORNE, OF BUFFALO, NEW YORK.

IMPROVEMENT IN PORTABLE HEATERS.

Specification forming part of Letters Patent No. 204,862, dated June 11, 1878; application filed December 17, 1877.

*To all whom it may concern:*

Be it known that I, GEORGE L. THORNE, of Buffalo, in the county of Erie and State of New York, have invented certain new and useful Improvements on a Portable Heater; and I do hereby declare that the following description of my said invention, taken in connection with the accompanying sheet of drawings, forms a full, clear, and exact specification, which will enable others skilled in the art to which it appertains to make and use the same.

My present invention has special reference to portable heaters for in and out door use; and it consists in the peculiar arrangement of parts and details of construction, as hereinafter first fully described, and then pointed out in the claims.

In the drawings hereinbefore mentioned, Figure 1 is a perspective view of my improved heater as it appears when packed together for transportation. Fig. 2 is a longitudinal section of the same, illustrating the manner of packing the various vessels and parts, &c., of which my heater is composed. Fig. 3 is a sectional view of one of the wick-tubes. Fig. 4 is an elevation of the heater, partly in section, as ready for use.

Like letters of reference indicate corresponding parts in all the various figures.

A is a reservoir for holding liquid fuel, such as alcohol or other spirits, or hydrocarbon oils. It is struck up from two disks of sheet metal, of which one is made with a wide rim and serves as the top and sides, and the other with a narrow edge answering as the bottom for this vessel. Upon the top disk are suitably disposed four (more or less) wick-tubes, B, which have suitable screw-caps C, by means of which said tubes B may be tightly closed to prevent the escape of the liquid in the vessel A when the same is being handled. Centrally upon the said top disk or at any other convenient place is fixed a filling-tube, D, constructed and arranged in precisely the same manner as the wick-tubes B, except that it may be smaller and shorter in dimensions.

E is a vessel, preferably constructed of perforated sheet metal, or struck up of non-perforated metal and afterward punctured. The bottom of this vessel has a series of apertures corresponding in number and size, and also in position, with those of the wick-tubes B. This vessel serves as a support for the cooking-vessels F and G, and when in use is placed either with its perforated bottom over the wick-tubes, the vessels F or G resting upon the edge of the rim of said support E, or it is reversed so that the punctured bottom carries the vessels F or G or any other smaller vessel, and the guard rests upon the notches N.

F and G are, as hereinbefore stated, cooking-vessels, and they are struck up of sheet metal and provided with loops or ears H, riveted or otherwise fastened to the rim of said vessels. Their purpose is twofold: first, to serve as means for handling the vessels F G when hot by means of the spoon J having the bent part K engaging with said ears H, as illustrated in Fig. 4; and, secondly, as a medium to enable the complete apparatus to be readily transported by passing the strap L through said ears, as depicted in Figs. 1 and 2.

The burners B are fitted with wicking or similar absorbent material to draw the liquid fuel from the reservoir by capillary attraction, and the cooking is accomplished by the heat produced by the combustion of the fuel.

It will be observed that the vessel E serves as a support for the cooking-vessels, and at the same time as a guard for the burners to prevent a current of cold air to strike the flame when the apparatus is used in the open air. Its bottom, being placed at some distance above the top disk of the vessel A, serves also as a protector for said vessel to prevent heat from reaching said vessel, and thus to evaporate the fuel, which, from the peculiar nature of this apparatus, should have a very low boiling-point.

When to be put together for transportation the guard and support E is placed inversely over the reservoir A, and the two vessels placed into the cooking-vessels F G, which latter thus form a casing for the entire apparatus, so that the whole assumes the shape illustrated in Figs. 1 and 2, in which case the entire apparatus is reduced to the smallest possible bulk, and can be readily carried either in a person's pocket or by means of the belt L strapped to the person carrying the same. When thus placed together there remains within the apparatus between the top disk of the fuel-reservoir and the bottom of the guard sufficient space for the spoon J, and also for a small-sized fork and knife, so that the apparatus is complete within itself and forms a very convenient means for heating, cooking, boiling, frying, &c., a meal outdoors.

In addition to its indicated purpose my portable heater can be successfully used for vapor or hot-air baths, and in case the four burners should, for this or other purposes, not produce sufficient heat, the filling-tube D may also be provided with wicking, so that five burners may be brought into action.

To enable smaller-sized vessels than those supplied with the apparatus to be placed upon my heater, there remains nothing to be done but to reverse the guard E, so that its edge rests upon the vessel A and its bottom is turned upward; but to prevent the said guard from sliding down over said reservoir to assume the position it is intended to occupy when the apparatus is packed up for transportation, I form three (more or less) notches, N, in the rim of said guard, and bend the parts thus notched inwardly, so that the guard will virtually rest upon and be carried by said notches N, while it is prevented from being easily pushed off the reservoir by its rim overlapping the said vessel A.

To place the guard when thus constructed over the reservoir for packing, the said guard is placed over said reservoir from one side, so that two of the notches N are already over the rim of said reservoir. Now, by putting the finger through one of the burner-apertures the third notch may be pushed outward and the guard will readily slip over said reservoir.

To avoid soldering the wick and filling tubes B D upon the top of the reservoir A, which will show badly, particularly so after the vessel is nickel or silver plated, I provide the flaring part $b$, Fig. 3, with a square shouldered offset, $b'$, and a straight part, $b''$, and make the apertures in the top disk the size of said straight part. The wick-tubes, &c., being thus inserted into the top disk, rest upon the square shoulder $b'$, and are soldered on the under side of the top disk around the straight part $b''$ before the bottom disk is soldered to the top disk, in which case no solder will show on the top side, and its appearance is therefore very neat and attractive when finished.

Having thus fully described my invention, I claim as new and desire to secure to me by Letters Patent of the United States—

1. The reversible support and guard E, constructed of perforated sheet metal, having the burner-apertures in its bottom and the notched parts N in its rim, as and for the use and purpose specified.

2. The burners B, having the square shoulder $b'$ and straight tubular part $b''$, in combination with the vessel A having apertures for said straight tubular part, as and for the purpose specified.

3. The portable heater hereinbefore described, consisting, essentially, of the reservoir A having the wick-tubes B, the perforated support and guard E, the vessels F and G with the loops H, and the spoon J with the bend K, the parts being arranged for operation and transportation, substantially as set forth and stated.

In testimony that I claim the foregoing as my invention I have hereto set my hand and affixed my seal in the presence of two subscribing witnesses.

GEO. L. THORNE. [L. S.]

Attest:
A. H. BRADLEY,
F. H. PICKETT.